United States Patent
Cho et al.

(10) Patent No.: US 11,180,392 B2
(45) Date of Patent: *Nov. 23, 2021

(54) SEQUENCING BATCH REACTOR FOR SEWAGE TREATMENT AND SEWAGE TREATMENT SYSTEM COMPRISING SAME

(71) Applicant: DOOSAN HEAVY INDUSTRIES & CONSTRUCTION CO., LTD., Changwon-si (KR)

(72) Inventors: Hwan Chul Cho, Seoul (KR); Seong Ju Kim, Jinju-si (KR); Yang Oh Jin, Gyeonggi-do (KR); Chul Woo Lee, Changwon-si (KR)

(73) Assignee: DOOSAN HEAVY INDUSTRIES & CONSTRUCTION CO. LTD., Gyeongnangnam-do (KR)

(*) Notice: Subject to any disclaimer, the term of this patent is extended or adjusted under 35 U.S.C. 154(b) by 45 days.

This patent is subject to a terminal disclaimer.

(21) Appl. No.: 16/812,379

(22) Filed: Mar. 9, 2020

(65) Prior Publication Data
US 2020/0207650 A1    Jul. 2, 2020

Related U.S. Application Data

(63) Continuation of application No. 15/953,399, filed on Apr. 13, 2018, now Pat. No. 10,626,035.

(30) Foreign Application Priority Data

Apr. 18, 2017   (KR) .................... 10-2017-0049522
Jun. 20, 2017   (KR) .................... 10-2017-0077929

(51) Int. Cl.
   *C02F 1/44*      (2006.01)
   *C02F 3/28*      (2006.01)
   (Continued)

(52) U.S. Cl.
   CPC .............. *C02F 3/282* (2013.01); *C02F 1/38* (2013.01); *C02F 1/44* (2013.01); *C02F 3/1215* (2013.01);
   (Continued)

(58) Field of Classification Search
   None
   See application file for complete search history.

(56) References Cited

U.S. PATENT DOCUMENTS 6,485,646 B1    11/2002  Hendrik
10,626,035 B2 *  4/2020  Cho .................... C02F 3/282
   (Continued)

FOREIGN PATENT DOCUMENTS

JP    2015128747 A    7/2015
KR    10-2010-0109019 A1   10/2010
   (Continued)

OTHER PUBLICATIONS

A Korean Office Action dated Feb. 26, 2019 in connection with Korean Patent Application No. 10-2017-0049522.
(Continued)

*Primary Examiner* — Chester T Barry
(74) *Attorney, Agent, or Firm* — Invenstone Patent, LLC (57) ABSTRACT

Disclosed is a sequencing batch reactor (SBR) for sewage treatment. The SBR is applicable to an energy-producing sewage treatment system. The SBR includes a treatment tank and a hybrid bacterial strain screening tank. The treatment tank removes ammonium contained in supernatant liquid using anaerobic ammonium-oxidizing (anammox) bacteria. The hybrid bacterial strain screening tank screen anammox bacteria granules out by passing the supernatant liquid discharged from the treatment tank through the hybrid bacterial strain screening tank. The SBR generates biogas using the anammox bacteria and reduces the nitrogen con-
(Continued)

tent in the supernatant liquid. The SBR can separate the anammox bacteria granules with high separation efficiency, thereby shortening sewage treatment time and recycling activated sludge, resulting in a dramatic decrease in the amount of waste sludge.

20 Claims, 2 Drawing Sheets (51) Int. Cl.

| | |
|---|---|
| C02F 3/30 | (2006.01) |
| C02F 3/34 | (2006.01) |
| C02F 3/20 | (2006.01) |
| C02F 1/38 | (2006.01) |
| C02F 3/12 | (2006.01) |
| C02F 101/30 | (2006.01) |
| C02F 101/16 | (2006.01) |
| C02F 1/00 | (2006.01) |
| C02F 11/04 | (2006.01) |
| C02F 11/12 | (2019.01) |

(52) U.S. Cl.
CPC ............... *C02F 3/20* (2013.01); *C02F 3/305* (2013.01); *C02F 3/307* (2013.01); *C02F 3/341* (2013.01); *C02F 3/348* (2013.01); *C02F 1/001* (2013.01); *C02F 11/04* (2013.01); *C02F 11/12* (2013.01); *C02F 2101/166* (2013.01); *C02F 2101/30* (2013.01); *Y02E 50/30* (2013.01)

(56) References Cited

U.S. PATENT DOCUMENTS

| | | | | |
|---|---|---|---|---|
| 2013/0327709 A1* | 12/2013 | Stroot | ..................... | C02F 3/307 210/605 |
| 2014/0263010 A1* | 9/2014 | Liu | ........................... | C02F 3/28 210/195.2 |
| 2014/0305867 A1* | 10/2014 | Nyhuis | ................... | C02F 3/307 210/626 |
| 2016/0159673 A1* | 6/2016 | Gafri | ..................... | B01J 19/088 210/630 |
| 2018/0141840 A1* | 5/2018 | Nyhuis | ................... | C02F 3/105 |

FOREIGN PATENT DOCUMENTS

| | | |
|---|---|---|
| KR | 10-1430722 B1 | 8/2014 |
| KR | 10-2014-0124319 A1 | 10/2014 |
| KR | 10-2015-0096647 A1 | 8/2015 |

OTHER PUBLICATIONS

A Korean Office Action issued on Mar. 4, 2019 in connection with Korean Patent Application No. 10-2017-0077929.
Guoqiang Liu. Nitrification performance of activated sludge under low dissolved oxygen conditions 2010, Missouri University of Science and Technology, pp. 6-7.
Sewer facility standard, 2011, Korea Water and Wastewater Works Association.
A Korean Office Action dated Aug. 1, 2019 in connection with Korean Patent Application No. 10-2017-0049522.
Wikipedia. Anammox.[online],<URL: https://en.wikipedia.org/w/index.php?title=Anammox&oldid=769116813>.
Sewerage System Standard, Korea Water and Sewage Association (2011).
European Search Report dated Jul. 2, 2018 in corresponding European Patent Application No. 18167779.0.
M. Han et al: "Uncoupling the solids retention times of flocs and granules in mainstream deammonification: A screen as effective out-selection tool for nitrite oxidizing bacteria", Bioresource Technology, vol. 221, Sep. 1, 2016 (Sep. 1, 2016), pp. 195-204, XP055485591, Amsterdam, NL.
S. E. Vlaeminck et al: "Microbial resource management of one-stage partial nitritation/anammox", Microbial Biotechnology, vol. 5, No. 3, Mar. 27, 2012 (Mar. 27, 2012), pp. 433-448, XP.
A Korean Office Action dated Oct. 28, 2019 in connection with Korean Patent Application No. 10-2017-0077929.
Korea Water and Sewerage Association, Waterworks Standards, 2010, p. 563.
Naver blog (GreenWell), Classification of Separation, Oct. 2015.

* cited by examiner

SEQUENCING BATCH REACTOR FOR SEWAGE TREATMENT AND SEWAGE TREATMENT SYSTEM COMPRISING SAME

CROSS-REFERENCE TO RELATED APPLICATIONS

This application is a continuation of U.S. application Ser. No. 15/953,399, filed on Apr. 13, 2018, now U.S. Pat. No. 10,626,035, which claims priority to Korean Patent Application No. 10-2017-0049522 filed Apr. 18, 2017 and Korean Patent Application No. 10-2017-0077929, filed Jun. 20, 2017, the entire contents of which are incorporated herein for all purposes by these references.

BACKGROUND OF THE DISCLOSURE

Field of the Disclosure

The present disclosure generally relates to a sequencing batch reactor (SBR) for sewage treatment and to a sewage treatment system including the SBR. More particularly, the present disclosure relates to a sequencing batch reactor (SBR) for sewage treatment, which is capable of improving energy production efficiency of a continuous influent feed sewage treatment process performed in an energy-producing sewage treatment system by lowering the content of nitrogen in sewage, and to a sewage treatment system including the SBR.

Description of the Related Art

Conventional sewage treatment plants typically use an activated sludge process, a combined form of an activated sludge process and an additional process, or a modified activated sludge process. Specifically, in many countries other than Korea, an anoxiclanaerobic/oxic ($A^2/O$) process, a UCT process, a VIP process, and the like are generally used. However, these processes are not applicable to the domestic sewage treatment plant in Korea in which a combined sewer system is used. The $A^2/O$ process is a technology improved from a conventional anaerobic-oxic (AO) process and is a biological treatment process to remove nitrogen and phosphorous. A sewage treatment system using an $A^2/O$ process includes an anaerobic tank, an anoxic tank, and an aerobic tank and involves an internal recycle (also referred to as nitrifier recycle) for removing nitrate-nitrogen and an activated sludge recycle. In the anaerobic tank, phosphorous release occurs under anaerobic conditions, resulting in microbial luxury uptake in the aerobic tank. In the anoxic tank, a denitrification process, in which nitrate contained in internal return water returned from the aerobic tank is converted into nitrogen, is performed so that nitrogen and phosphorous can be removed.

It is possible to reduce nutritive salts contained in sewage through the removal of nitrogen and phosphorous by using the $A^2/O$ process. However, the $A^2/O$ process is a technology developed with focus only on reduction in nutritive salts in sewage, and it is unsatisfactory in terms of removal of nitrogen and phosphorous. Therefore, the $A^2/O$ process has a problem of being unable to remove bacteria and microorganisms which are contained in sewage and harmful to human body.

Most sewage treatment plants are operated based on biological treatment in which pollutants are decomposed by microorganisms. Biological treatment methods have proven their performance for a long time and are most effective and safest treatment methods. However, such methods have a problem of producing a great amount of waste sludge.

Most waste sludge is a mass of microorganisms and organic matter. Therefore, it easily decays so that its treatment is problematic. So far, disposal of the waste sludge has been mainly relied on marine dumping and only a portion of the waste sludge has been landfilled or incinerated. The amount of waste sludge generated was more than 10,000 tons per day in 2012, meaning more than a total of 3.65 million tons of sludge annually, and it will continue to increase in the future.

With respect to the treatment of waste sludge, since 2002, marine dumping had been banned and policies for promoting conversion of organic waste to renewable energy, such as waste recycling, waste reduction, and energy production from waste, have been implemented. Specifically, in the treatment of sludge using an anaerobic digestion tank, a pretreatment process is carried out to increase the treatment efficiency. The pretreatment techniques include: biological treatment methods using high temperature aerobic microorganisms; physical treatment methods using ultrasonic wave, hydrodynamic cavitation, thermal hydrolysis, or ball milling; chemical treatment methods using ozone treatment and alkaline chemical treatment; a complex treatment method in which combinations of those methods are used; and electrical treatment methods using electrolysis. However, these methods are not cost effective or have low sludge reduction efficiency. Therefore, it is difficult to commercially use any of these methods.

Korean Patent No. 10-135458 discloses a sludge solubilization method for increasing the digestion efficiency of the anaerobic digestion tank, where the waste sludge generated in a wastewater treatment process is treated with an alkali catalyst and methanol to soften or destroy the cell membrane of biodegradable microorganisms existing in the sludge to improve the anaerobic digestion efficiency of the digestion tank.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Accordingly, an object of the present disclosure is to provide a sewage treatment sequencing batch reactor capable of reducing an installation site area for facilities thereof by having a simple structure, of reducing a treatment process time, and of recycling activated sludge.

Another object of the present disclosure is to provide a sewage treatment system capable of minimizing an installation site area for facilities thereof by using the sewage water treatment SBR having a simple structure of reducing generation of byproducts and a treatment process time, and of obtaining renewable energy by producing biogas.

The above and other objects, features, and advantages of the present disclosure will be more clearly understood from the following detailed description taken in conjunction with the accompanying drawings and claims.

Embodiments of the present disclosure are presented to make complete the disclosure of the present disclosure and help those who are ordinarily skilled in the art best understand the disclosure. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

In the drawings, the thicknesses of lines or the sizes of elements or layers may be exaggeratedly illustrated for clarity and convenience of description, and like components are denoted by like reference numerals. Moreover, the term "and/or" includes any and all combinations of one or more of the associated listed items.

The terminology used herein is for the purpose of describing particular embodiments only and is not intended to be limiting the disclosure. As used herein, the singular forms "a," "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

According to one embodiment of the present disclosure, the present disclosure provides to a sequencing batch reactor (SBR) for sewage treatment, applicable to an energy-producing sewage treatment system, the sequencing batch reactor including: a treatment tank in which supernatant liquid decanted from a digestion tank is retained; and a bioreaction tank for separating the supernatant liquid into anaerobic ammonium-oxidizing (anammox) bacteria granules and liquid containing activated sludge, wherein the bioreaction tank reciprocates a membrane to remove foreign materials attached to the membrane.

The bioreaction tank may be installed in a treated water storage tank connected to the treatment tank.

The treated water storage tank may be provided with an anammox bacteria transportation pipe for transporting anammox bacteria granules screened out by the bioreaction tank to the treatment tank.

The bioreaction tank may include: a membrane support frame; a membrane module attached to the membrane support frame; a moving unit connected to the membrane support frame and moving the membrane support frame in a reciprocating manner, and a sludge floatation unit arranged at a lower end of the membrane support frame and floating sludge deposited in the treatment tank.

The membrane module may include a plurality of porous membranes.

The porous membranes may have pores having a size of 50 to 150 μm.

The activated sludge may include at least one species selected from the group consisting of ammonia oxidizing archaea (AOA), ammonia oxidizing bacteria (AOB), and nitrite oxidizing bacteria (NOB).

The bioreaction tank may include an air feeding unit for feeding air to promote adsorption of organic matter contained in sewage to activated sludge.

The bioreaction tank may include a membrane bioreactor (MBR) for separating activated sludge onto which organic matter is adsorbed.

The anammox bacteria may be planctomycetes.

The anammox bacteria may be planctomycetes granules.

The SBR may further include a biogas collector for collecting biogas generated by the digestion tank.

According to a first aspect of the present disclosure, there is provided a sequencing bioreactor (SBR) for sewage treatment, applicable to an energy-producing sewage treatment system. The SBR includes a treatment tank and a hybrid bacterial strain screening tank. The treatment tank removes ammonium contained in supernatant liquid by using anammox bacteria. The hybrid bacterial strain screening tank filters the supernatant liquid discharged from the treatment tank by passing the supernatant liquid through a hybrid bacterial strain screening zone provided therein, thereby screening ammonium-oxidizing bacteria granules out.

The hybrid bacterial strain screening tank may include: a housing having a hybrid bacterial strain screening zone therein having a truncated circular conical shape; a feeding unit installed to extend through the housing and the hybrid bacterial strain screening zone, the feeding unit feeding the supernatant liquid to the hybrid bacterial strain screening zone; and a recovery unit for recovering the supernatant liquid having passed through the hybrid bacterial strain screening zone.

The hybrid bacterial strain screening zone may have a truncated circular conical shape having an upper diameter larger than a lower diameter thereof; so that the supernatant liquid introduced into the hybrid bacterial strain screening zone forms a vortex in the bacterial strain screening zone due to a difference between the upper diameter and the lower diameter, thereby swirling downward in the bacterial strain screening zone.

The hybrid bacterial strain screening zone may include a vortex-forming portion and a membrane, and the vortex-forming portion and the membrane are disposed respectively at an upper portion and a lower portion of the truncated circular conical shape.

The sequencing batch reactor may further include an anammox bacteria transport pipe such that anammox bacteria granules contained in the supernatant liquid introduced into the hybrid bacterial strain screening zone are screened out by the membrane and the anammox bacteria granules that are screened out are transported to the treatment tank through the anaerobic ammonium-oxidizing bacteria transport pipe.

The membrane has pores having a pore size of 50 to 150 μm.

The activated sludge may contain one or more species selected from the group consisting of ammonia oxidizing archaea (AOA), ammonia oxidizing bacteria (AOB), and nitrite oxidizing bacteria (NOB).

The anaerobic ammonium-oxidizing bacteria may be planctomycetes.

The anaerobic ammonium-oxidizing bacteria may be planctomycetes granules.

According to another aspect of the disclosure, there is provided a sewage treatment system including: a primary settling tank in which pollutants in sewage settle to produce raw sludge and primary treated water, a bioreaction tank in which organic substances contained in the primary treated water discharged from the primary settling tank are adsorbed onto activated sludge to form a flock, the floc is removed, and a denitrification process is performed; a secondary settling tank in which waste sludge contained in biologically treated water discharged from the bioreaction tank is settled; a dehydration tank in which the raw sludge recovered from the primary settling tank and the waste sludge recovered from the secondary settling tank is dehydrated; a digestion tank in which the raw sludge and the waste sludge dehydrated in the dehydration tank undergoes a anaerobic digestion process, thereby generating biogas; and the sequencing batch reactor according to the first aspect, the sequencing batch reactor removing nitrogen contained in supernatant liquid discharged from the digestion tank.

The sequencing batch reactor may include a hybrid bacterial strain screening tank for removing ammonium by reacting the supernatant liquid discharged from the digestion tank with anaerobic ammonium-oxidizing bacteria, and separating anaerobic ammonium-oxidizing bacteria granules contained in the supernatant liquid and activate sludge from each other.

The hybrid bacterial strain screening tank may include: a housing having a hybrid bacterial strain screening zone therein, having a truncated circular conical shape; a feeding unit installed to extend through the housing and the hybrid bacterial strain screening zone and feeding supernatant liquid to the hybrid bacterial strain screening zone; and a recovery unit for recovering the supernatant liquid having passed through the hybrid bacterial strain screening zone.

The hybrid bacterial strain screening tank may include a vortex-forming portion provided at an upper portion thereof and a membrane provided at a lower portion thereof.

The hybrid bacterial strain screening tank may further include a supernatant liquid feeding unit for transporting supernatant liquid containing activated sludge to the primary settling tank.

The activated sludge includes one or more species selected from the group consisting of ammonia oxidizing archaea (AOA), ammonia oxidizing bacteria (AOB), and nitrite oxidizing bacteria (NOB).

The bioreaction tank may be equipped with an air feeder for feeding air such that organic substances in sewage are adsorbed onto the activated sludge.

The bioreaction tank may include a hybrid bacterial strain screening tank for separating the activated sludge onto which the organic substances are adsorbed.

The anaerobic ammonium-oxidizing bacteria may be planctomycetes.

The anaerobic ammonium-oxidizing bacteria may be planctomycetes granules.

The sewage treatment system may further include a biogas collector for collecting biogas generated from the digestion tank.

According to the present disclosure, the sequencing batch reactor (SBR) for sewage treatment generates energy in the digestion tank and reduces the content of nitrogen contained in supernatant liquid by reacting the supernatant liquid with anaerobic ammonium-oxidizing bacteria. Subsequently, the SBR supplies the supernatant liquid from which the content of nitrogen is reduced to a sewage treatment system, thereby maintaining an overall concentration of nitrogen lower than a predetermined level in the sewage over the whole sewage treatment system and improving energy production efficiency of the sewage treatment system.

In addition, since the SBR reaction tank is equipped with the membrane bioreactor (MBR) and/or the hybrid bacterial strain screening tank, the SBR according to the present disclosure performs solid-liquid separation with high separation efficiency, thereby reducing the treatment time. In addition, by recycling separated activated sludge, it is possible to dramatically reduce the amount of waste sludge. Therefore, it is possible to minimize the footprint of the sewage treatment system and increase sewage treatment efficiency per site area.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Hereinbelow, exemplary embodiments of the present disclosure will be described in detail with reference to the accompanying drawings. The present disclosure may, however, be embodied in many different forms and should not be construed as being limited to the embodiments set forth herein. Rather, these embodiments are provided so that this disclosure will be through and complete, and will fully convey the concept of the disclosure to those skilled in the art.

Hereinafter, a sequencing batch reactor (SBR) for sewage treatment and an energy-producing sewage treatment system according to embodiments of the disclosure will be described below in conjunction with the accompanying drawings.

Figure 1:
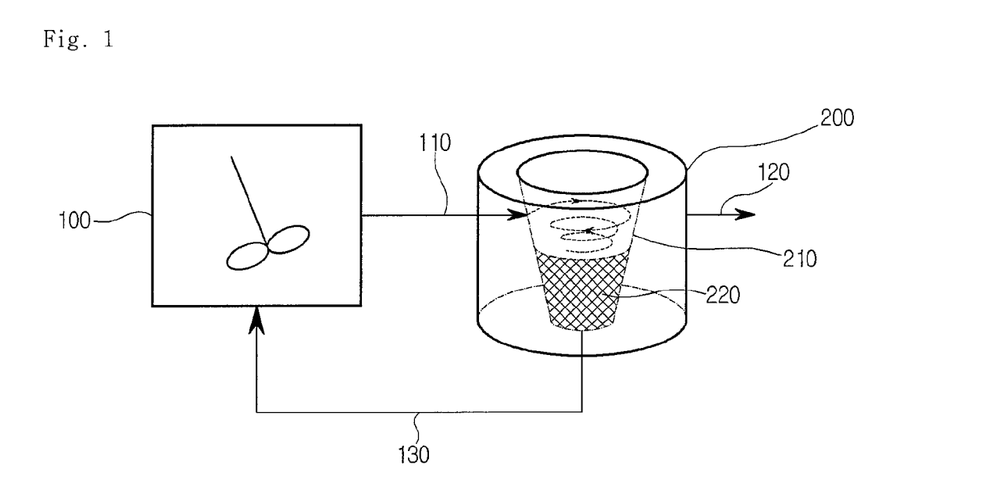
FIG. 1 is a diagram illustrating a schematic configuration of a sequencing batch reactor (SBR) for sewage treatment, according to one embodiment of the present disclosure.

FIG. 1 is a diagram illustrating a schematic configuration of a sequencing batch reactor (SBR) for sewage treatment, according to one embodiment of the disclosure. The SBR includes a treatment tank 100 and a hybrid bacterial strain screening tank 200. The treatment tank 100 is a vessel in which supernatant liquid (effluent) produced by a digestion tank is temporarily retained. To lower the content of ammonium contained in the supernatant liquid, the supernatant liquid is reacted with anaerobic ammonium-oxidizing (abbreviated to anammox) bacteria.

After the completion of the reaction, anammox granules resulting from the reaction between the anammox bacteria and the supernatant liquid are present in the supernatant liquid along with activated sludge. The anammox granules and the activated sludge are separated by using the sizes of sludge particles and then separately recycled. The hybrid bacterial strain screening tank 200 is used for this process.

Figure 2:
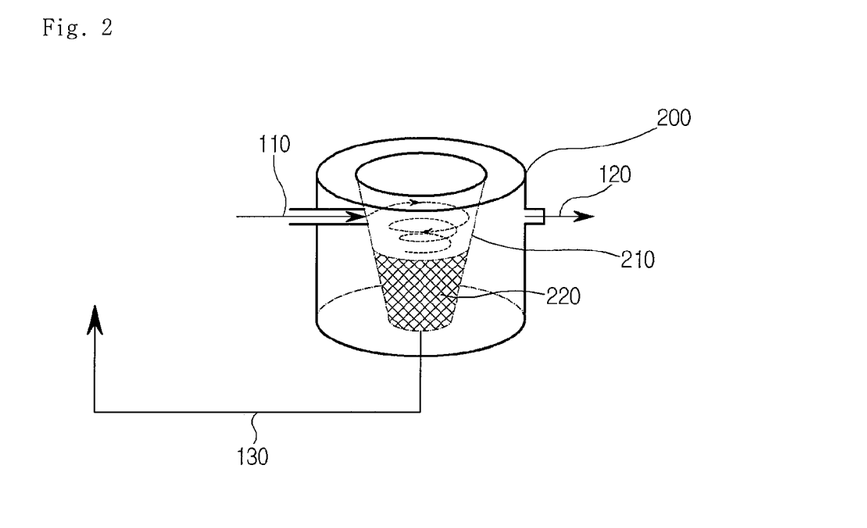
FIG. 2 is a diagram illustrating a hybrid screening tank for screening and isolating microorganisms.

The hybrid bacterial strain screening tank 200 will be described in more detail with reference to FIG. 2.

The hybrid bacterial strain screening tank 200 includes a housing provided with a hybrid bacterial strain screening zone 210 comprising a truncated circular conical shape, a feeding unit extending through the housing and the hybrid bacterial strain screening zone 210 and feeding the supernatant liquid to the hybrid bacterial strain screening zone 210, and a recovery unit for collecting the supernatant liquid flowing through the hybrid bacterial strain screening zone 210.

The hybrid bacterial strain screening zone 210 is disposed inside the housing, and the feeding unit is configured to extend through the housing and the hybrid bacterial strain screening zone to feed the supernatant liquid to the hybrid bacterial strain screening zone 210. The feeding unit may be composed of a pipe extending through the housing to be connected to the hybrid bacterial strain screening zone 210.

The supernatant liquid 110 discharged from the treatment tank 100 is introduced into the hybrid bacterial strain screening zone 210 at a constant flow rate. For example, the supernatant liquid 110 flows down into the hybrid bacterial strain screening tank 200 from above, then passes through the hybrid bacterial strain screening zone 210, and finally flows out.

Preferably, the hybrid bacterial strain screening zone 210 is of a truncated circular conical shape. When the diameter of the upper end of the hybrid bacterial strain screening zone 210 of the truncated circular conical shape is larger than that of the lower end thereof the supernatant liquid 110 forms a vortex while passing through the hybrid bacterial strain screening zone 210 of the truncated circular conical shape, thereby swirling down in the hybrid bacterial strain screening zone 210.

Preferably, the hybrid bacterial strain screening zone 210 may include a vortex-forming portion and a membrane 220. The vortex-forming portion and the membrane 220 are respectively disposed at an upper portion and a lower portion of the truncated circular conical form. The supernatant liquid 110 forms a vortex in the vortex-forming portion when passing through the hybrid bacterial strain screening zone 210, and the vortex is discharged from the hybrid bacterial strain screening zone 210 through the membrane 220 provided at the bottom of the hybrid bacterial strain screening zone 210.

The membrane 220 has pores having a size of 50 to 150 μm. Therefore, the anammox bacteria granules which are larger than the pore size cannot pass through the membrane 220 but to remain in the hybrid bacterial strain screening zone 210, but the activated sludge particles which are smaller than the pore size and the supernatant liquid 120 containing the activated sludge particles can be discharged from the hybrid bacterial strain screening zone 210 through the membrane 220 and then introduced into the internal space of the housing.

The supernatant liquid 120 stays in the housing until it reaches a predetermined liquid level and then overflows into a primary settling tank through the recovery unit of the housing when the supernatant liquid 120 increases to reach or to be higher than the predetermined level.

The anammox bacteria granules retained in the hybrid bacterial strain screening zone 210 are collected and transported to the treatment tank 100. The anammox bacteria granules transported to the treatment tank 100 are returned to be reused in the treatment tank.

Figure 3:
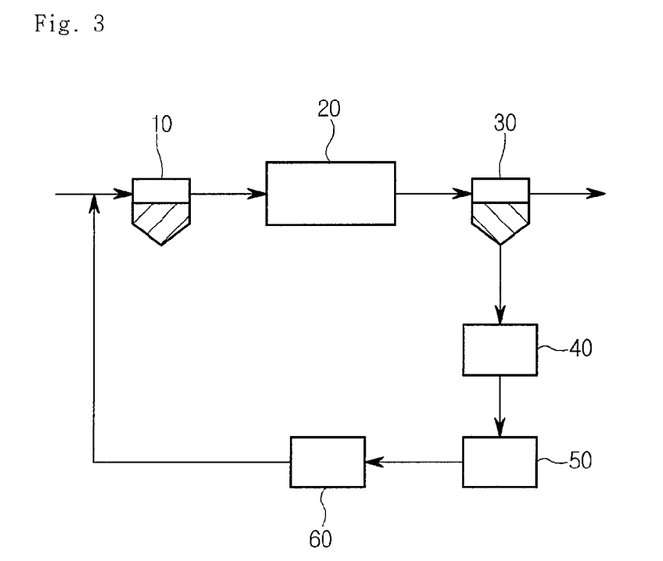
FIG. 3 is a diagram illustrating a schematic configuration of a sewage treatment system according to one embodiment of the present disclosure.

FIG. 3 is a diagram illustrating a schematic configuration of a sewage treatment system according to one embodiment. The sewage treatment system includes a primary settling tank 10, a bioreaction tank 20, a secondary settling tank 30, a dehydration tank 40, a digestion tank 50, and an SBR reaction tank 60.

According to the disclosure, sewage is first fed to the primary settling tank 10, pollutants contained in the sewage settle down to the bottom of the primary settling tank to become raw sludge which is later recycled, and supernatant liquid from which the pollutants (e.g., raw sludge) is removed is fed to the bioreaction tank 20. More specifically, when the sewage is fed to the primary settling tank 10, it separates into a layer of heavier substances (e.g., raw sludge) having a higher specific gravity than water and into a layer of lighter substances (e.g., suspended solids) having a lower specific gravity than water. Through this process, about 40% of the total pollutants in sewage can be removed.

Next, supernatant liquid resulting through the removal of raw sludge from the sewage in the primary settling tank 10 may be fed to the bioreaction tank 20.

The bioreaction tank 20 includes an aerobic tank, a hybrid bacterial strain screening tank, and an anaerobic tank. More specifically, the aerobic tank allows organic substances contained in the supernatant liquid to be adsorbed onto activated sludge. The aerobic tank includes an inlet through which the supernatant liquid is fed to the aerobic tank, a mixing cell for mixing the supernatant liquid and activated sludge, and an aerobic reaction zone that is connected to the mixing cell and in which organic substances are adsorbed onto the activated sludge. The activated sludge functions to adsorb organic substances contained in sewage. Through this adsorption process, the pollutants can be, at least partly or completely, removed in a short time.

The adsorption of organic substances to the activated sludge is performed under aerobic conditions. To this end, an air feeder may be connected to the aerobic reaction zone to feed air.

The aerobic reaction zone is provided to remove pollutants in sewage by using activated sludge. Therefore, optimum operation conditions for the activated sludge should be maintained.

That is, the aerobic reaction zone needs to maintain the following operation conditions: a temperature is maintained within a range of values from 10 to 35° C., a retention time for which pollutants may be sufficiently adsorbed onto activated sludge is secured, and a pH of sewage is maintained within a range of values from 6.5 to 8.5.

According to the embodiment, sewage that is a target to be treated is fed to the aerobic reaction zone through the inlet, and the sewage is mixed with activated sludge so that organic substances can be adsorbed onto the activated sludge. The activated sludge includes at least one of ammonia oxidizing archaea (AOA), ammonia oxidizing bacteria (AOB), and nitrite oxidizing bacteria (NOB) so that organic substances can be adsorbed onto the activated sludge.

According to the embodiment, the mixing cell may be equipped with one or more stirrers, thereby promoting mixing between the sewage and the activated sludge.

In the present disclosure, although it is not necessary to limit the shape of the stirrer, it may be an impeller with multiple blades, for example. Although it is not necessary to specifically limit the shape of the impeller-type stirrer, it is preferable that the impeller-type stirrer is structured such that an outer blade is bent toward a lower end of an inner blade so that the blades can strongly push water such that a large amount of water can flow in a desired direction, thereby maximizing mixing efficiency.

When the stirrer has multiple blades, the multiple blades may have the same size or different sizes. Preferably, the multiple blades may have different sizes and may be arranged such that the size of each blade decreases from the blade that is disposed at an upper portion of the reaction zone to the blade that is disposed at a lower portion of the reaction zone. In this case, a high mixing rate can be maintained while influent (e.g., feed sewage) moves from the upper portion to the lower portion of the reaction zone.

The value (e.g., G-value) of g force of the blade of the stirrer is not specifically limited, and it may be determined depending on the scale of mixing or flocculation or depending on the size of the reaction tank. However, for example, it may be preferably within a range of values from 30 to 110 $sec^{-1}$.

According to the embodiment, a reaction aid (e.g., flocculant) may be added to the sewage along with the activated sludge. The reaction aid may be at least one selected from the group consisting of clay, calcium hydroxide, cationic flocculant, anionic flocculant, and non-ionic flocculant.

When the organic substances are adsorbed onto the activated sludge to grow to become a floc, the treated water resulting from the process performed in the aerobic tank is supplied to the hybrid bacterial strain screening tank connected to the aerobic tank. The activated sludge onto which the organic substances are adsorbed cannot pass through the membrane installed in the hybrid bacterial strain screening tank, thereby remaining as solid sludge in the tank. That is, the hybrid bacterial strain screening tank separates the sewage into solids (e.g., sludge) and liquid (e.g., primarily treated water).

According to the present disclosure, first organic substances contained in sewage are adsorbed onto activated sludge and flocculate in the aerobic tank of the bioreaction tank, and subsequently the sewage is separated into solid (e.g., sludge) and liquid (e.g., primary treated water) by the hybrid bacterial strain screening tank. The primarily treated water is then transported to the anaerobic tank to undergo denitrification. A description of the denitrification process performed in the anaerobic tank will not be set forth herein.

According to the present disclosure, it is possible to separate solid-phase sludge having a small water content of only 70 to 80% from sewage by using the hybrid bacterial strain screening tank of the bioreaction tank 20. In addition, unlike conventional membrane bioreactors, the water treatment system of the present disclosure does not require an additional air feeder for removing foreign substances attached to the membrane.

Since the hybrid bacterial strain screening tank is constructed and operated in the same way as described above, a more specific description thereof will be omitted here. That is, the hybrid bacterial strain screening tank may be used in combination with the treatment tank of the SBR, or it also may be used in combination with the bioreaction tank 20.

Both of the treatment tank 10 and the bioreaction tank 20 of the SBR generate granular sludge by using anammox bacteria. At this time, the generated granular sludge is too large to pass through the membrane of the hybrid bacterial strain screening zone. Thus, the granular sludge filtered out by the membrane of the hybrid bacterial strain screening tank of the bioreaction tank 20 is collected and returned to a preceding stage so as to be reused. Meanwhile, the treated water passing through the membrane proceeds to the next treatment stage. That is, the anammox bacterial granules 130 which were not able to pass through the hybrid bacterial strain screening zone of the bioreaction tank 20 are returned to the treatment tank 100 and reused there, and the supernatant liquid 120 containing activated sludge, which passes through the hybrid bacterial strain screening zone, is returned to the primary settling tank 10 to be reused.

In the wastewater treatment system, pollutants contained in sewage settle to become sludge in the primary settling tank 10, and the remainder of the sewage, which is treated water (e.g., liquid), is transported to the bioreaction tank 20. The treated water transported to the bioreaction tank 20 undergoes an organic substance removal process and a denitrification process by sequentially passing through the aerobic tank, the hybrid bacterial strain screening tank, and the anaerobic tank of the bioreaction tank.

Secondary treated water that results from the denitrification process performed in the anaerobic tank is retained in the secondary settling tank 30 so that excess activated sludge (e.g., waste sludge) is removed from the secondary treated water, and then the resulting treated water is disinfected and finally discharged to the outside of the water treatment system.

The raw sludge and the excess activated sludge generated through the settling process respectively in the primary settling tank and the secondary settling tank are transported to the dehydration tank 40, and then dehydrated. Next, thickened sludge resulting from the dehydration process is transported to the digestion tank 50.

In the present disclosure, the digestion tank 50 performs an anaerobic digestion process on the raw sludge and the excess activated sludge by using anaerobic microorganisms.

The "anaerobic digestion" also may be referred to as "methane fermentation" that is a process in which organic substances contained in the excess sludge are decomposed mainly into methane and carbon by various anaerobic microorganisms. Specifically, this process includes: liquefaction and hydrolysis for decomposing insoluble organic compounds into soluble monomers and short chain fatty acids (e.g., volatile organic acids) including acetic acid, propionic acid, and butyric acid; gasification for converting these intermediate products into acetic acid and hydrogen gas ($H_2$); and methanogenesis for producing methane by using products of the previous stage.

In the present disclosure, the digestion tank 50 treats the thickened sludge and recovers energy from biogas (e.g., methane). Accordingly, the water treatment system according to the present disclosure may include a biogas collector (not illustrated) for collecting biogas generated by the digestion tank 50, and may further include a biogas membrane for separating the biogas into methane and carbon dioxide as necessary.

In the present disclosure, the anaerobic digestion process performed in the digestion tank 50 produces digested sludge that cannot be recycled and supernatant liquid. The digested sludge may be discarded or disposed and the supernatant liquid may be supplied to the SBR reaction tank 60.

The SBR reaction tank 60 is a sequential batch reactor so that a sequencing batch activated sludge process is performed in the SBR reaction tank 60. In conventional SBR processes, one batch reactor functions as both of a reaction tank and a secondary settling tank so that reaction of a sewage-and-sludge mixture, settling of pollutants, decanting of supernatant liquid, discharging of settled sludge, etc. are repeatedly performed in the same tank.

In conventional sewage treatment systems, an anaerobic digestion process for digesting thickened sludge is performed in the digestion tank 50, and the supernatant liquid resulting from the digestion process is returned to the primary settling tank to be retreated. In that case, the supernatant liquid decanted from the digestion tank 50 contains $NH^{4+}$ or $NO^{2-}$. Therefore, in the case of a continuous influent feed sewage treatment process, the concentration of nitrogen continuously increases with time. Thus, a carbon-to-nitrogen (C/N) ratio in the bioreaction tank 20 comes to exceed 1, and eventually energy generation efficiency of the digestion tank 50 is deteriorated.

In order to solve this problem, according to the present disclosure, the supernatant liquid generated from the digestion tank 50 is transported to the SBR reaction tank 60 to react with anammox bacteria, so that $NH^{4+}$ and $NO^{2-}$ contained in the supernatant liquid is converted into $N_2$, resulting in removal of nitrogen.

According to the embodiment of the disclosure, planctomycetes are used as the anammox bacteria. AOB bacteria generally used as activated sludge in the bioreaction tank 20 can convert about 50% of $NH^{4+}$ into $NO^{2-}$ into nitrogen ($N_2$). Meanwhile, planctomycetes used in the SBR reaction tank 60 in the embodiment of the present disclosure can convert all of $NH^{4+}$ and $NO^{2-}$ into $N_2$. Furthermore, planctomycetes generate granules having a relatively large size by being adsorbed on organic substances, in comparison with AOA, AOB, or NOB. Therefore, as described above, the granules generated by the planctomycetes can be easily screened out by the hybrid bacterial strain screening tank 200.

According to the present disclosure, it is possible to remove nitrogen contained in the supernatant liquid by transporting the supernatant liquid to the SBR reaction tank 60. Therefore, even in the case where treated water generated by the SBR reaction tank 60 is transported to the primary settling tank 10, the C/N ratio equal to or lower than 1 (e.g., C/N ratio≤1) can be maintained in the bioreaction tank 20, so that energy production efficiency is not deteriorated even through a continuous influent feed SBR process for sewage treatment.

The supernatant liquid transported to the SBR reaction tank 60 may be retained in the treatment tank 100. According to the present disclosure, the supernatant liquid transported to the treatment tank 100 undergoes an anaerobic digestion process by anaerobic ammonium-oxidizing bacteria, so that granules thereof are formed.

According to the present disclosure, the pore size of the membrane is set to be within a range of values from 50 to 150 μm so that the bacteria granules cannot pass through the membrane while bacteria such as AOA, AOB, and NOB which are contained in the activated sludge can pass through the membrane in the bioreaction tank 20.

According to the present disclosure, the supernatant liquid and the bacteria, such as AOA, AOB, and NOB contained in the supernatant liquid, may be returned to the primary settling tank 10 via a treated water feed pipe.

Although the present disclosure has been described in conjunction with the preferred embodiment and the accompanying drawings, the present disclosure should not be construed as being limited to the embodiment. Those skilled in the art will appreciate that various modifications, additions, and substitutions are possible, without departing from the scope and spirit of the disclosure as disclosed in the accompanying claims.

What is claimed is:

1. A sequencing batch reactor (SBR) for sewage treatment, the SBR comprising:
    a treatment tank as a reaction tank configured to discharge supernatant liquid in which ammonium contained in the supernatant liquid is removed by using anaerobic ammonium-oxidizing (anammox) bacteria; and
    a hybrid bacterial strain screening tank as a reaction tank configured to filter the supernatant liquid discharged from the treatment tank by passing the supernatant liquid through a hybrid bacterial strain screening zone of a circular frustum shape provided in the hybrid bacterial strain screening tank, to screen out ammonium-oxidizing bacteria granules,
    wherein the circular frustum shape of the hybrid bacterial strain screening zone has a lower diameter and an upper diameter larger than the lower diameter so that the supernatant liquid introduced into the hybrid bacterial strain screening zone forms a vortex in the bacterial strain screening zone due to a difference between the upper diameter and the lower diameter, thereby swirling downward in the bacterial strain screening zone.

2. The sequencing batch reactor according to claim 1, wherein the hybrid bacterial strain screening tank comprises:
    a housing comprising the hybrid bacterial strain screening zone;
    a feeding unit installed perpendicularly with respect to a longitudinal axis of the circular frustum shape so as to extend into the housing and communicate with the hybrid bacterial strain screening zone and configured to feed the supernatant liquid to the hybrid bacterial strain screening zone; and
    a recovery unit for collecting and returning the supernatant liquid passing through the hybrid bacterial strain screening zone.

3. The sequencing batch reactor according to claim 1, wherein the hybrid bacterial strain screening zone comprises an upper portion and a lower portion, the lower portion having an outer circumferential surface extending from the upper portion to a bottom of the lower portion.

4. The sequencing batch reactor according to claim 3, wherein the hybrid bacterial strain screening zone further comprises:
    a vortex-forming portion disposed at the upper portion of the circular frustum shape; and
    a membrane disposed on the outer circumferential surface of the lower portion of the circular frustum shape and configured to discharge the supernatant liquid and particles of activated sludge from the hybrid bacterial strain screening zone through the membrane to be introduced into an internal space of the housing.

5. The sequencing batch reactor according to claim 4, wherein the activated sludge contains one or more species selected from the group consisting of ammonia oxidizing archaea (AOA), ammonia oxidizing bacteria (AOB), and nitrite oxidizing bacteria (NOB).

6. The sequencing batch reactor according to claim 4, further comprising an anaerobic ammonium-oxidizing bacteria transport pipe such that the anaerobic ammonium-oxidizing bacteria granules contained in the supernatant liquid introduced into the hybrid bacterial strain screening zone are screened out by the membrane and the anaerobic ammonium-oxidizing bacteria granules which are screened out are transported to the treatment tank through the anaerobic ammonium-oxidizing bacteria transport pipe.

7. The sequencing batch reactor according to claim 4, wherein the membrane has pores having a pore size between 50 and 150 μm.

8. The sequencing batch reactor according to claim 1, wherein the anaerobic ammonium-oxidizing bacteria granules include planctomycetes granules.

9. A sewage treatment system comprising:
    a plurality of series-connected tanks into which sewage is introduced, the plurality of series-connected tanks discharging supernatant liquid and including:
        a primary settling tank in which pollutants in the sewage settle to produce raw sludge and primarily treated water, and
        a secondary settling tank in which waste sludge contained in biologically treated water produced from the primarily treated water is settled, the secondary settling tank disinfecting and then discharging from the sewage treatment system the biologically treated water after the waste sludge is settled; and
    a sequencing batch reactor (SBR) for removing nitrogen contained in the discharged supernatant liquid.

10. The sewage treatment system according to claim 9, wherein the SBR comprises:
    a treatment tank as a reaction tank configured to discharge supernatant liquid in which ammonium contained in the supernatant liquid discharged from the plurality of series-connected tanks is removed by using anaerobic ammonium-oxidizing (anammox) bacteria; and
    a hybrid bacterial strain screening tank as a reaction tank configured to filter the supernatant liquid discharged from the treatment tank by passing the supernatant liquid through a hybrid bacterial strain screening zone of a circular frustum shape provided in the hybrid bacterial strain screening tank, to screen out ammonium-oxidizing bacteria granules.

11. The sewage treatment system according to claim 10, wherein the circular frustum shape of the hybrid bacterial strain screening zone has a lower diameter and an upper diameter larger than the lower diameter so that the supernatant liquid introduced into the hybrid bacterial strain screening zone forms a vortex in the bacterial strain screening zone due to a difference between the upper diameter and the lower diameter, thereby swirling downward in the bacterial strain screening zone.

12. The sewage treatment system according to claim 9, wherein the plurality of series-connected tanks further includes:
   a bioreaction tank in which organic substances contained in the primarily treated water discharged from the primary settling tank are adsorbed onto activated sludge to form the floc, the floc is removed, and a denitrification process is performed, the bioreaction tank discharging the biologically treated water to the secondary settling tank;
   a dehydration tank in which the raw sludge recovered from the primary settling tank and the waste sludge recovered from the secondary settling tank is dehydrated; and
   a digestion tank in which the raw sludge and the waste sludge dehydrated in the dehydration tank undergoes an anaerobic digestion process, thereby generating biogas.

13. The sewage treatment system according to claim 12, wherein the digestion tank is configured to discharge the supernatant liquid to the SBR, and
   wherein the hybrid bacterial strain screening tank is configured to react the supernatant liquid discharged from the digestion tank with anaerobic ammonium-oxidizing bacteria and to separate anaerobic ammonium-oxidizing bacteria granules contained in the supernatant liquid and activate sludge from each other.

14. The sewage treatment system according to claim 12, further comprising a biogas collector for collecting the biogas generated from the digestion tank.

15. The sewage treatment system according to claim 10, wherein the hybrid bacterial strain screening tank comprises:
   a housing comprising the hybrid bacterial strain screening zone;
   a feeding unit installed perpendicularly with respect to a longitudinal axis of the circular frustum shape so as to extend into the housing and communicate with the hybrid bacterial strain screening zone and configured to feed the supernatant liquid to the hybrid bacterial strain screening zone; and
   a recovery unit for collecting and returning the supernatant liquid passing through the hybrid bacterial strain screening zone.

16. The sewage treatment system according to claim 15, wherein the hybrid bacterial strain screening zone comprises:
   an upper portion and a lower portion, the lower portion having an outer circumferential surface extending from the upper portion to a bottom of the lower portion;
   a vortex-forming portion disposed at the upper portion of the circular frustum shape; and
   a membrane disposed on the outer circumferential surface of the lower portion of the circular frustum shape and configured to discharge the supernatant liquid and particles of activated sludge from the hybrid bacterial strain screening zone through the membrane to be introduced into an internal space of the housing.

17. The sewage treatment system according to claim 15, wherein the hybrid bacterial strain screening tank further comprises a supernatant liquid feeding unit for transporting supernatant liquid containing activated sludge to the primary settling tank.

18. The sewage treatment system according to claim 10, wherein the activated sludge includes one or more species selected from the group consisting of ammonia oxidizing archaea (AOA), ammonia oxidizing bacteria (AOB), and nitrite oxidizing bacteria (NOB).

19. The sewage treatment system according to claim 10, wherein the bioreaction tank is equipped with an air feeder for feeding air such that organic substances in sewage are adsorbed onto the activated sludge.

20. The sewage treatment system according to claim 10, wherein the bioreaction tank includes a hybrid bacterial strain screening tank for separating the activated sludge onto which the organic substances are adsorbed.

\* \* \* \* \*